US012684409B2

(12) United States Patent
He et al.

(10) Patent No.: US 12,684,409 B2
(45) Date of Patent: Jul. 14, 2026

(54) TECHNIQUES FOR USING BUFFER SIZE TABLES FOR HIGH DATA THROUGHPUT IN WIRELESS COMMUNICATIONS

(71) Applicant: QUALCOMM Incorporated, San Diego, CA (US)

(72) Inventors: Linhai He, San Diego, CA (US); Iyab Issam Sakhnini, San Diego, CA (US); Diana Maamari, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 327 days.

(21) Appl. No.: 18/366,551

(22) Filed: Aug. 7, 2023

(65) Prior Publication Data

US 2024/0056880 A1 Feb. 15, 2024

Related U.S. Application Data

(60) Provisional application No. 63/370,885, filed on Aug. 9, 2022.

(51) Int. Cl.
H04W 28/02 (2009.01)
H04W 72/1268 (2023.01)

(52) U.S. Cl.
CPC ... H04W 28/0278 (2013.01); H04W 72/1268 (2013.01)

(58) Field of Classification Search
CPC ......... H04W 28/0278; H04W 72/1268; H04W 72/21
See application file for complete search history.

(56) References Cited

U.S. PATENT DOCUMENTS

| | | | | |
|---|---|---|---|---|
| 2021/0297895 A1* | 9/2021 | Lee | | H04W 72/21 |
| 2022/0132364 A1* | 4/2022 | Lee | | H04W 28/0278 |
| 2024/0121787 A1* | 4/2024 | Lee | | H04W 72/1263 |
| 2024/0406793 A1* | 12/2024 | Bagheri | | H04W 28/0278 |
| 2025/0227692 A1* | 7/2025 | Lee | | H04W 72/1268 |

FOREIGN PATENT DOCUMENTS

| | | |
|---|---|---|
| EP | 3297355 | 3/2018 |
| WO | 2016/064010 | 4/2016 |
| WO | 2022/034537 | 2/2022 |

OTHER PUBLICATIONS

International Search Report and Written Opinion dated Nov. 22, 2023 from corresponding PCT Application No. PCT/US2023/071875.
Qualcomm Incorporated: "Capacity enhancements for XR traffic", 3GPP Draft; R2-2207050, 3rd Generation Partnership Project ( 3GPP) , Mobile Competence Centre ; .650, Route Des Lucioles; F-06921 Sophia-Antipolis Cedex ; France, vol. RAN WG2, No. e-Meeting; Aug. 17, 2022-Aug. 26, 2022 Aug. 10, 2022 (Aug. 10, 2022), XP052260373. Retrieved from the Internet: URL:https://ftp.3gpp.org/tsg_ran/WG2_RL2/TSGR2_119-e/Docs/R2-2207050.zip R2-2207050 Capacity enhancements for XR.docx [retrieved on Aug. 10, 2022].

* cited by examiner

*Primary Examiner* — Donald L Mills
(74) *Attorney, Agent, or Firm* — ArentFox Schiff, LLP

(57) ABSTRACT

Aspects described herein relate to encoding a buffer size in a buffer status report based on a newly defined buffer size table that can have reduced step sizes for larger buffer sizes. Other aspects relate to decoding the buffer size in the buffer status report. The newly defined buffer size table can better accommodate buffer size reporting for high data throughput applications.

30 Claims, 7 Drawing Sheets

500

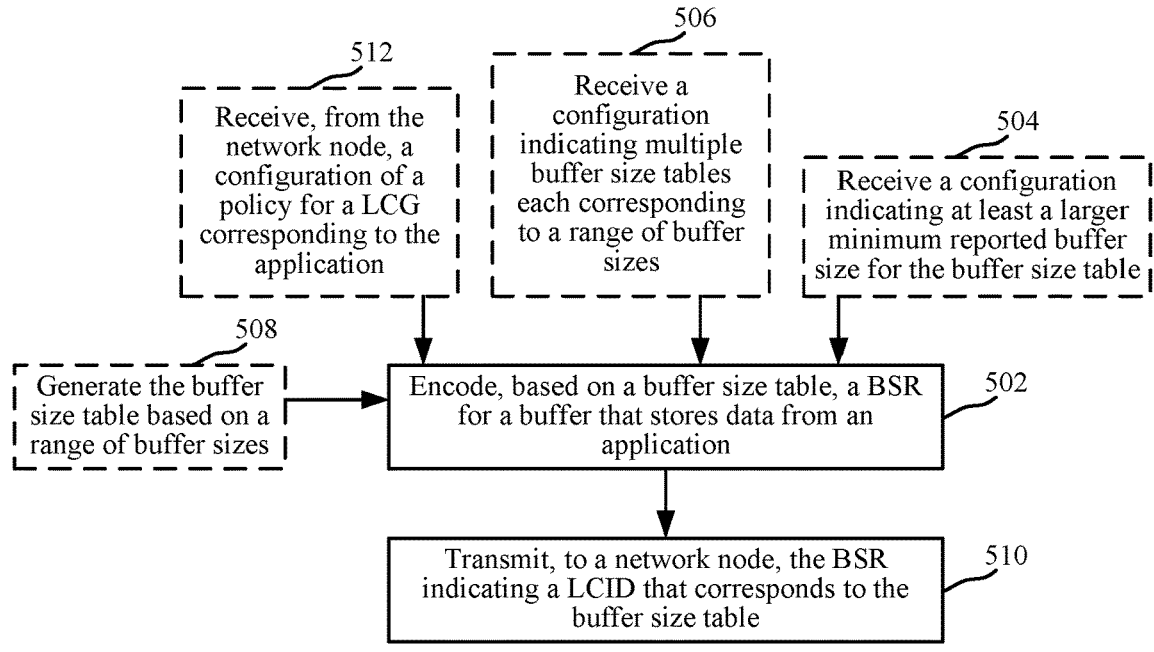

506

512

Receive, from the
network node, a
configuration of a
policy for a LCG
corresponding to the
application Receive a
configuration
indicating multiple
buffer size tables
each corresponding
to a range of buffer
sizes

504

Receive a configuration
indicating at least a larger
minimum reported buffer
size for the buffer size table

508

Generate the buffer
size table based on a
range of buffer sizes

Encode, based on a buffer size table, a BSR
for a buffer that stores data from an
application

502

Transmit, to a network node, the BSR
indicating a LCID that corresponds to the
buffer size table

TECHNIQUES FOR USING BUFFER SIZE TABLES FOR HIGH DATA THROUGHPUT IN WIRELESS COMMUNICATIONS

CLAIM OF PRIORITY UNDER 35 U.S.C. § 119

The present Application for Patent claims priority to Provisional Patent Application No. 63/370,885, entitled "TECHNIQUES FOR USING BUFFER SIZE TABLES FOR HIGH DATA THROUGHPUT IN WIRELESS COMMUNICATIONS" filed Aug. 9, 2022, which is assigned to the assignee hereof and hereby expressly incorporated by reference herein for all purposes.

FIELD OF THE DISCLOSURE

Aspects of the present disclosure relate generally to wireless communication systems, and more particularly, to techniques for using buffer size tables in buffer status reporting.

DESCRIPTION OF RELATED ART

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an aspect, an apparatus for wireless communication is provided that includes a transceiver, one or more memories configured to, individually or in combination, store instructions, and one or more processors communicatively coupled with the one or more memories. The one or more processors are, individually or in combination, configured to execute the instructions to cause the apparatus to encode, based on a buffer size table, a buffer status report for a buffer that stores data from an application, where the buffer size table is associated with a wireless communication technology and has a smaller step size for buffer sizes between two encoding points than a different buffer size table defined in the wireless communication technology, and transmit, to a network node, the buffer status report indicating a logical channel identifier that corresponds to the buffer size table.

In another aspect, an apparatus for wireless communication is provided that includes a transceiver, one or more memories configured to, individually or in combination, store instructions, and one or more processors communicatively coupled with the one or more memories. The one or more processors are, individually or in combination, configured to execute the instructions to cause the apparatus to receive, for a user equipment (UE), a buffer status report indicating a logical channel identifier that corresponds to a buffer size table, decode, based on the buffer size table, the buffer status report for a buffer that stores data from an application at the UE, where the buffer size table is associated with a wireless communication technology and has a smaller step size for buffer sizes between two encoding points than a different buffer size table defined in the wireless communication technology, and transmit, for the UE and based on the buffer status report, an uplink grant for transmitting the data.

In another aspect, a method for wireless communication at a UE is provided that includes encoding, based on a buffer size table, a buffer status report for a buffer that stores data from an application, where the buffer size table is associated with a wireless communication technology and has a smaller step size for buffer sizes between two encoding points than a different buffer size table defined in the wireless communication technology, and transmitting, to a network node, the buffer status report indicating a logical channel identifier that corresponds to the buffer size table.

In another aspect, a method for wireless communication at a network node is provided that includes receiving, for a UE, a buffer status report indicating a logical channel identifier that corresponds to a buffer size table, decoding, based on the buffer size table, the buffer status report for a buffer that stores data from an application at the UE, where the buffer size table is associated with a wireless communication technology and has a smaller step size for buffer sizes between two encoding points than a different buffer size table defined in the wireless communication technology, and transmitting, for the UE and based on the buffer status report, an uplink grant for transmitting the data.

In a further aspect, an apparatus for wireless communication is provided that includes a transceiver, a memory configured to store instructions, and one or more processors communicatively coupled with the transceiver and the memory. The one or more processors are configured to execute the instructions to perform the operations of methods described herein. In another aspect, an apparatus for wireless communication is provided that includes means for performing the operations of methods described herein. In yet another aspect, a computer-readable medium is provided including code executable by one or more processors to perform the operations of methods described herein.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which:

FIG. 5 is a flow chart illustrating an example of a method for encoding and transmitting a buffer status report (BSR), in accordance with aspects described herein;

DETAILED DESCRIPTION

Figure 1:
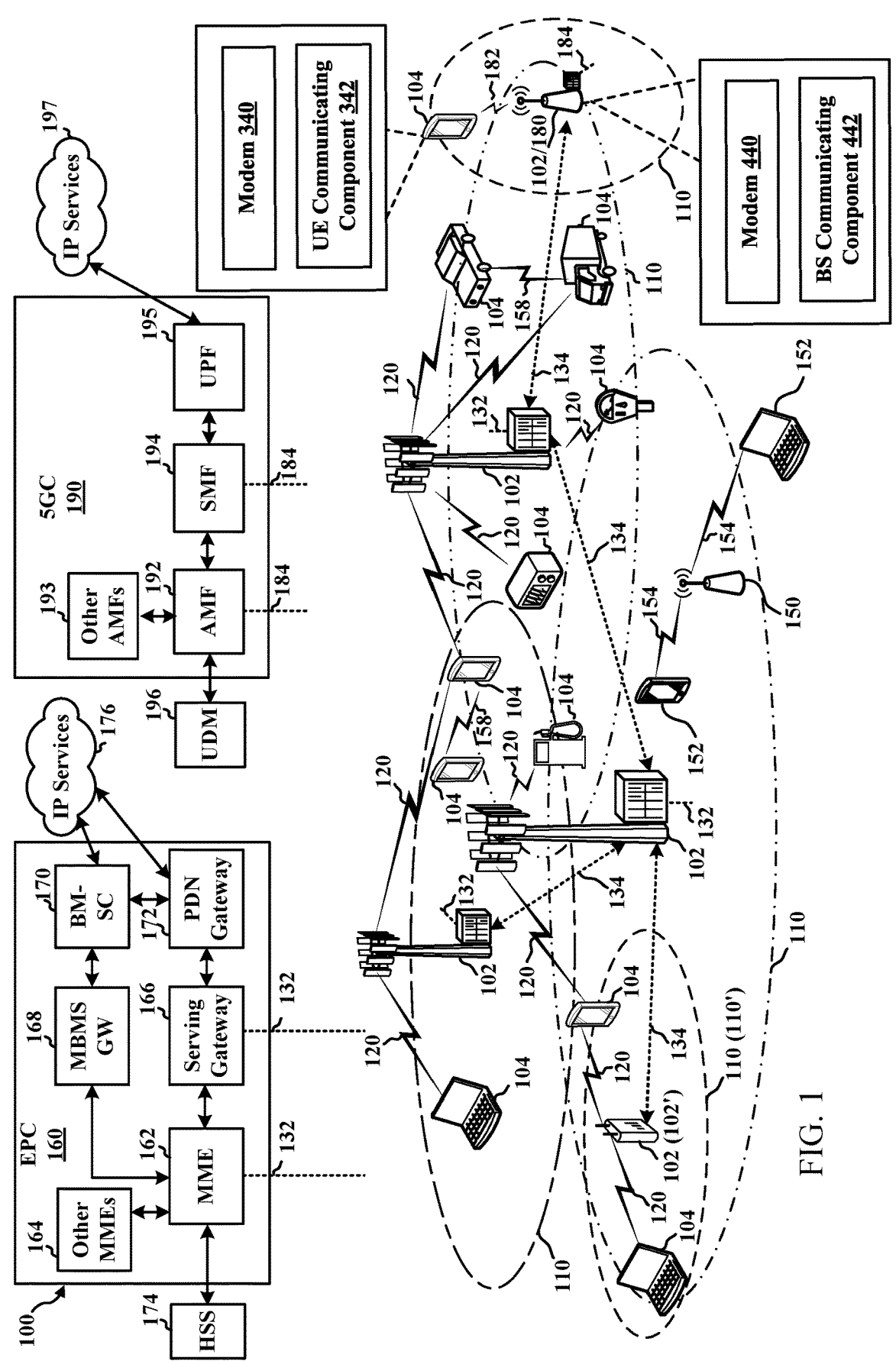
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to using or defining buffer size tables for buffer status reports (BSRs) for high data rate applications in wireless communications. In some wireless communication technologies, such as fifth generation (5G) new radio (NR), a user equipment (UE) can generate a BSR for transmitting to a network node (e.g., a base station, gNB, etc.), and can transmit the BSR to the network node, where the BSR can indicate an amount of data in a buffer of the UE for transmitting to the network node. For example, the data and buffer can be associated with a media access control (MAC) layer (also referred to as layer 2 (L2)) at the UE. In an example, the network node can configure (e.g., assign) data logical channels (LCH) into up to eight (8) logical channel groups (LCGs). The UE can report the total L2 buffer size of each LCG to network in BSR MAC control element (MAC-CE). In 5G NR, for example, the UE can encode a buffer size for each LCG by either 5 bits or 8 bits depending on the format of a BSR MAC-CE (e.g., short or long format, respectively). Long format and short format BSR MAC-CEs can use different encoding tables, as defined in 5G NR. For example, the UE can encode the buffer size based on a formula such as:

$$B_k = \lceil B_{min} \cdot (1 + p)^k \rceil \text{ where } p = (B_{max} / B_{min})^{1/(N-1)} - 1$$

where $B_{min}$ is a minimum reported buffer size value, $B_{max}$ is a maximum reported buffer size value, N is a number of encoding points (e.g., 32 for 5-bit BSR or 256 for 8-bit BSR), and k is a given encoding point from 1 to N (or 0 to N−1). This encoding formula may result in a constant or similar percentage error at each encoding point (e.g., $(B_{k+1} - B_k)/B_k$ can be similar for all values of k. In addition, for example, for smaller values of k, this formula can provide excellent granularity, but when k is large, each step between two adjacent code points can rapidly increase (as the formula is an exponential function). For example, at k=252, the buffer size can be 76,380,419 bytes, and at k=253, the buffer size can be 81,338,368 bytes, which is a step size of 4,957,949 bytes between these values of k. For applications having high data throughput, such as extended reality (XR), this large increase between buffer sizes may result in wasted resource usage where data in the buffer does not completely fill the indicated buffer size.

For example, XR applications can generate data by bursts, with each burst including multiple video frames. Therefore, each burst can be large in size, and packets in a burst arrive at a UE at almost the same time. In this example, buffer size reported by the UE often uses a large code point. XR traffic can be delay sensitive, so the network can try to schedule a burst with least number of uplink (UL) grants possible, and as such, UL grants for XR traffic tend to be large. As a result, UL grants for the UE often are larger than the amount of data buffered, causing the UE to pad transport blocks (TB) to fill the empty space. For the network, scheduling a UL grant with more resources than needed can waste radio resources. For the UE, padding the TB s and transmitting padded portions can be power inefficient.

In accordance with aspects described herein, new buffer size tables can be introduced or generated by the UEs to allow for improving indication of buffer size for applications with high data throughput, such as XR applications that communicate multiple video frames over a short period of time (e.g., a number of frames per second). Such applications can have or use higher data throughput than other applications that communicate text, images, or other small amounts of data, such as messaging applications, social media applications, etc., where the traffic is not as delay sensitive as XR applications. In one example, the new buffer size tables can have a reduced step size of larger values of k than a conventional buffer size table currently defined in 5G NR. In an example, the new buffer size tables can be associated with new unique logical channel identifiers (LC-IDs) to allow the UE to indicate use of the new buffer size table, and/or to allow the network node to determine the new buffer size table used by the UE. For example, the LCID can indicate or be associated with a formula or parameters corresponding to the buffer size table used by the UE to indicate buffer size in the BSR. In an example, reducing the step size for larger values of k can allow for indicating, in the BSR, a smaller buffer size range for larger amounts of buffered data than a conventional buffer size table currently defined in 5G NR. This can result in less radio resource utilization for UL grants for data of the indicated buffer size, less processing resource utilization at the UE for generating the buffer size and reduce TB padding, etc. Reduction in resource and processing utilization can improve communication throughput and user experience when using the UE or other device.

In some aspects described herein a buffer status report for a buffer that stores data from an application can be encoded based on a buffer size table, which may be a new buffer size table described herein. The buffer status report can indicate a LCID that corresponds to the buffer size table. Using the LCID can allow the network node receiving the BSR to determine the buffer size table used to indicate the buffer size in the BSR. This can facilitate use of new buffer size tables for certain applications (e.g., XR applications) that can reduce step size for larger buffer sizes, as described herein. For example, using the LCID can provide a compact, standard-compliant process of using an already defined value of LCID to introduce the new buffer size tables and allow the UE and/or network node to more accurately reflect the large buffer size of the corresponding buffer.

The described features will be presented in more detail below with reference to FIGS. 1-7.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

As used herein, a processor, at least one processor, and/or one or more processors, individually or in combination, configured to perform or operable for performing a plurality of actions is meant to include at least two different processors able to perform different, overlapping or non-overlapping subsets of the plurality actions, or a single processor able to perform all of the plurality of actions. In one non-limiting example of multiple processors being able to perform different ones of the plurality of actions in combination, a description of a processor, at least one processor, and/or one or more processors configured or operable to perform actions X, Y, and Z may include at least a first processor configured or operable to perform a first subset of X, Y, and Z (e.g., to perform X) and at least a second processor configured or operable to perform a second subset of X, Y, and Z (e.g., to perform Y and Z). Alternatively, a first processor, a second processor, and a third processor may be respectively configured or operable to perform a respective one of actions X, Y, and Z. It should be understood that any combination of one or more processors each may be configured or operable to perform any one or any combination of a plurality of actions.

As used herein, a memory, at least one memory, and/or one or more memories, individually or in combination, configured to store or having stored thereon instructions executable by one or more processors for performing a plurality of actions is meant to include at least two different memories able to store different, overlapping or non-overlapping subsets of the instructions for performing different, overlapping or non-overlapping subsets of the plurality actions, or a single memory able to store the instructions for performing all of the plurality of actions. In one non-limiting example of one or more memories, individually or in combination, being able to store different subsets of the instructions for performing different ones of the plurality of actions, a description of a memory, at least one memory, and/or one or more memories configured or operable to store or having stored thereon instructions for performing actions X, Y, and Z may include at least a first memory configured or operable to store or having stored thereon a first subset of instructions for performing a first subset of X, Y, and Z (e.g., instructions to perform X) and at least a second memory configured or operable to store or having stored thereon a second subset of instructions for performing a second subset of X, Y, and Z (e.g., instructions to perform Y and Z). Alternatively, a first memory, and second memory, and a third memory may be respectively configured to store or have stored thereon a respective one of a first subset of instructions for performing X, a second subset of instruction for performing Y, and a third subset of instructions for performing Z. It should be understood that any combination of one or more memories each may be configured or operable to store or have stored thereon any one or any combination of instructions executable by one or more processors to perform any one or any combination of a plurality of actions. Moreover, one or more processors may each be coupled to at least one of the one or more memories and configured or operable to execute the instructions to perform the plurality of actions. For instance, in the above non-limiting example of the different subset of instructions for performing actions X, Y, and Z, a first processor may be coupled to a first memory storing instructions for performing action X, and at least a second processor may be coupled to at least a second memory storing instructions for performing actions Y and Z, and the first processor and the second processor may, in combination, execute the respective subset of instructions to accomplish performing actions X, Y, and Z. Alternatively, three processors may access one of three different memories each storing one of instructions for performing X, Y, or Z, and the three processor may in combination execute the respective subset of instruction to accomplish performing actions X, Y, and Z. Alternatively, a single processor may execute the instructions stored on a single memory, or distributed across multiple memories, to accomplish performing actions X, Y, and Z.

Techniques described herein may be used for various wireless communication systems such as CDMA, TDMA, FDMA, OFDMA, single carrier-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3$^{rd}$ Generation Partnership Project" (3GPP). CDMA2000 and UMB are described in documents from an organization named "3$^{rd}$ Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) new radio (NR) networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 is a diagram illustrating an example of a wireless communications system and an access network 100. The wireless communications system (also referred to as a wireless wide area network (WWAN)) can include base stations 102, Ues 104, an Evolved Packet Core (EPC) 160, and/or a 5G Core (5GC) 190. The base stations 102 may include macro cells (high power cellular base station) and/or small cells (low power cellular base station). The macro cells can include base stations. The small cells can include femtocells, picocells, and microcells. In an example, the base stations 102 may also include gNBs 180, as described further herein. In one example, some nodes of the wireless communication system may have a modem 340 and UE communicating component 342 for transmitting a BSR indicating a certain buffer size table used to encode a buffer size in the BSR, in accordance with aspects described herein. In addition, some nodes may have a modem 440 and BS communicating component 442 for decoding a buffer size from a BSR from a UE based on a buffer size table indicated by the BSR, in accordance with aspects described herein. Though a UE 104 is shown as having the modem 340 and UE communicating component 342 and a base station 102/gNB 180 is shown as having the modem 440 and BS communicating component 442, this is one illustrative example, and substantially any node or type of node may include a modem 340 and UE communicating component 342 and/or a modem 440 and BS communicating component 442 for providing corresponding functionalities described herein.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, head compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 134 may be wired or wireless.

The base stations 102 may wirelessly communicate with one or more Ues 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the Ues 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/Ues 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (Pcell) and a secondary component carrier may be referred to as a secondary cell (Scell).

In another example, certain Ues 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range. A base station 102 referred to herein can include a gNB 180.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the Ues 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the Ues 104 and the 5GC 190. Generally, the AMF 192 can provide QoS flow and session management. User Internet protocol (IP) packets (e.g., from one or more Ues 104) can be transferred through the UPF 195. The UPF 195 can provide UE IP address allocation for one or more Ues, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of Ues 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the Ues 104 may be referred to as IoT devices (e.g., parking meter, gas pump, toaster, vehicles, heart monitor, etc.). IoT Ues may include machine type communication (MTC)/enhanced MTC (eMTC, also referred to as category (CAT)-M, Cat M1) Ues, NB-IoT (also referred to as CAT NB1) Ues, as well as other types of Ues. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS, e.g., BS 102), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (Cus), one or more distributed units (Dus), or one or more radio units (RUs)). In some aspects, a CU may be implemented within a RAN node, and one or more Dus may be co-located with the CU, or alternatively, may be geographically or virtually distributed throughout one or multiple other RAN nodes. The Dus may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

In an example, UE communicating component 342 can use a certain buffer size table to encode a buffer size for a buffer in a BSR. The certain buffer size table, in some examples, may have improved granularity for encoding larger buffer sizes as compared to other buffer size tables, such as legacy buffer size tables currently defined in 5G NR. In an example, UE communicating component 342 can indicate use of a certain buffer size table by using a corresponding value for a LCID in the BSR. In an example, BS communicating component 442 can receive the BSR from the UE, and can decode the buffer size based on the certain buffer size table. In one example, BS communicating component 442 can determine the certain buffer size table used by the UE 104 based on the LCID specified for the buffer. Using a buffer size table with improved granularity (e.g., smaller step sizes) for large buffer sizes can improve resource utilization for certain applications that communicate using large data bursts, such as XR applications.

Figure 2:
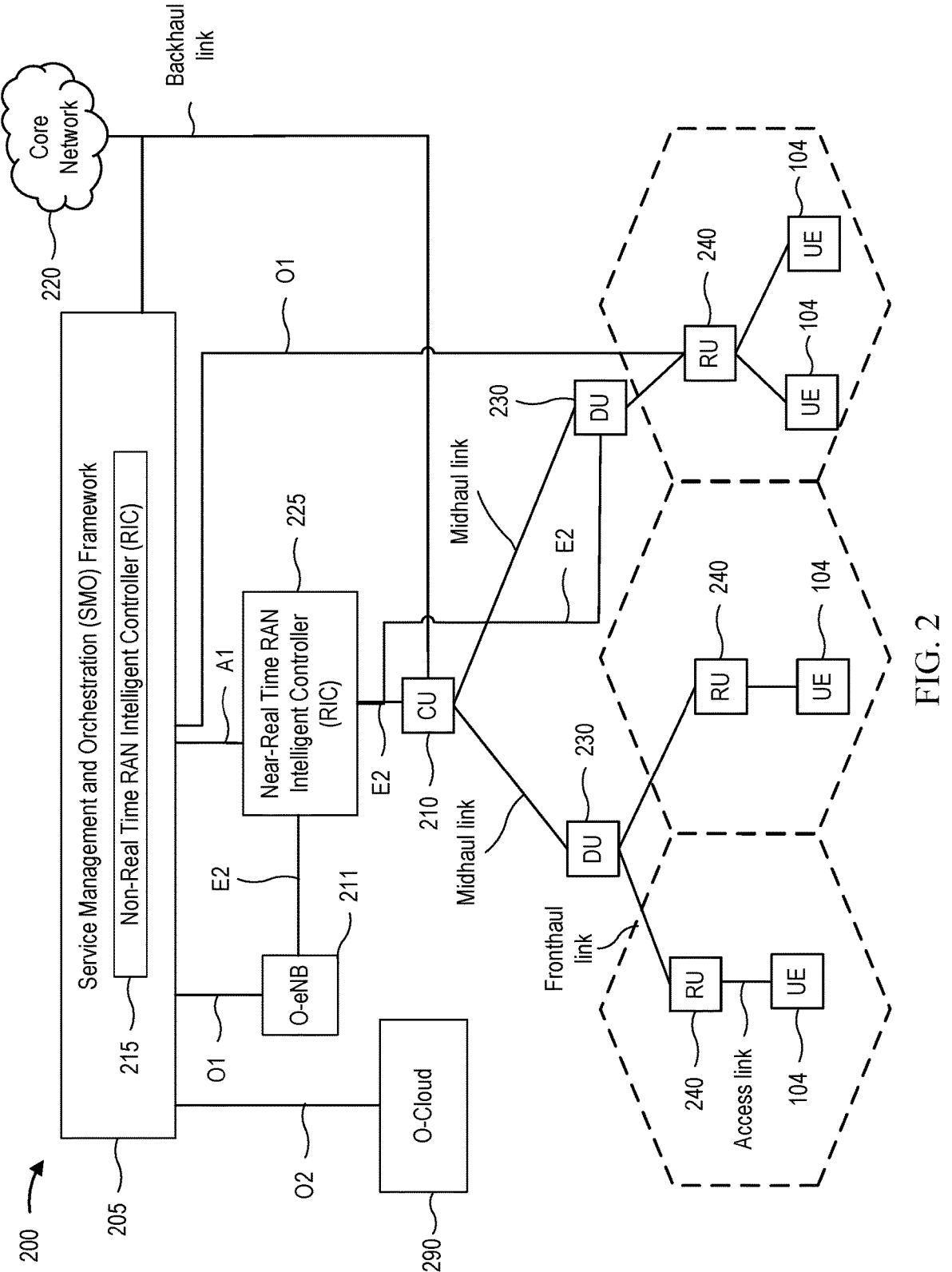
FIG. 2 is a diagram illustrating an example of disaggregated base station architecture, in accordance with various aspects of the present disclosure.

FIG. 2 shows a diagram illustrating an example of disaggregated base station 200 architecture. The disaggregated base station 200 architecture may include one or more central units (Cus) 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (Dus) 230 via respective midhaul links, such as an F1 interface. The Dus 230 may communicate with one or more radio units (RUs) 240 via respective fronthaul links. The RUs 240 may communicate with respective Ues 104 via one or more radio frequency (RF) access links. In some implementations, the UE 104 may be simultaneously served by multiple RUs 240.

Each of the units, e.g., the Cus 210, the Dus 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (i.e., Central Unit—User Plane (CU-UP)), control plane functionality (i.e., Central Unit—Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the third Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communication with one or more Ues 104. In some implementations, real-time and non-real-time aspects of control and user plane communication with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, Cus 210, Dus 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more Cus 210, one or more Dus 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

In an example, BS communicating component 442, as described herein, can be at least partially implemented within a CU 210, and can receive BSRs from Ues via one or more Dus 230, transmit configuration information to the Ues via one or more Dus 230, and/or the like. In another example, BS communicating component 442, as described herein, can be at least partially implemented within a DU 230, and can receive BSRs from Ues via one or more RUs 240, transmit configuration information to the Ues via one or more RUs 240, and/or the like.

Figure 6:
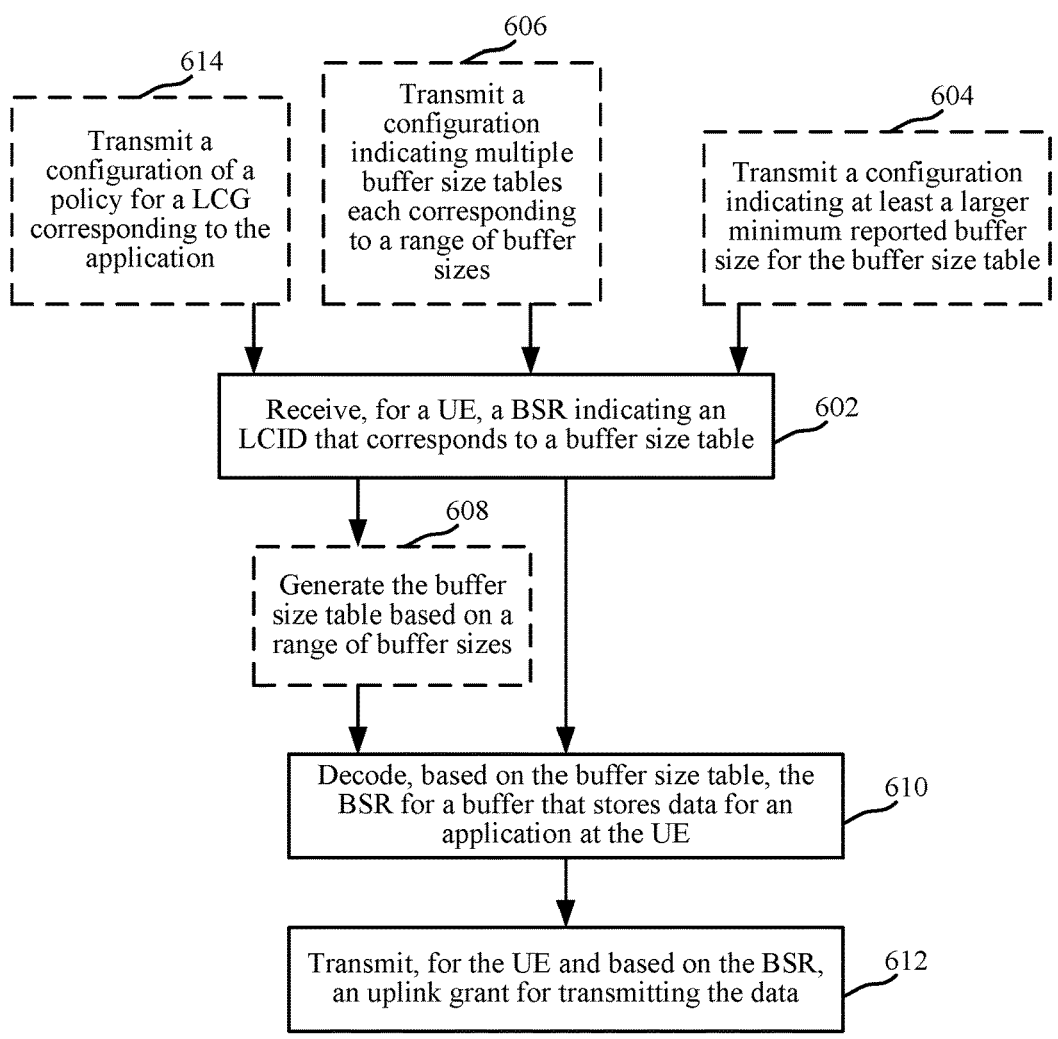
FIG. 6 is a flow chart illustrating an example of a method for receiving and decoding a BSR, in accordance with aspects described herein.

Turning now to FIGS. 3-7, aspects are depicted with reference to one or more components and one or more methods that may perform the actions or operations described herein, where aspects in dashed line may be optional. Although the operations described below in FIGS. 5 and 6 are presented in a particular order and/or as being performed by an example component, it should be understood that the ordering of the actions and the components performing the actions may be varied, depending on the implementation. Moreover, it should be understood that the following actions, functions, and/or described components may be performed by a specially programmed processor, a processor executing specially programmed software or computer-readable media, or by any other combination of a hardware component and/or a software component capable of performing the described actions or functions.

Figure 3:
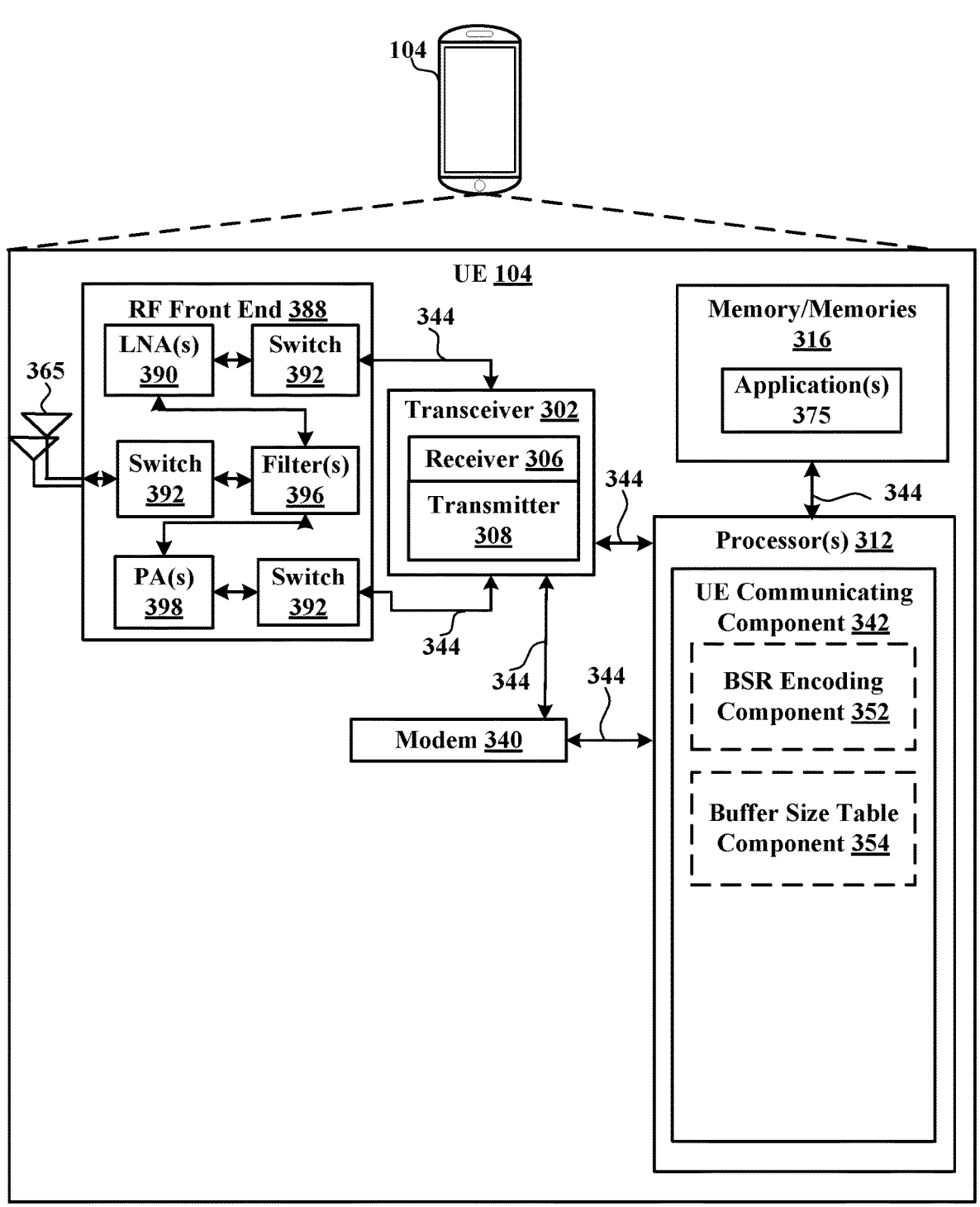
FIG. 3 is a block diagram illustrating an example of a user equipment (UE), in accordance with various aspects of the present disclosure.

Referring to FIG. 3, one example of an implementation of UE 104 may include a variety of components, some of which have already been described above and are described further herein, including components such as one or more processors 312 and one or more memories 316 and one or more transceivers 302 in communication via one or more buses 344. For example, the one or more processors 312 can include a single processor or multiple processors configured to perform one or more functions described herein. For example, the multiple processors can be configured to perform a certain subset of a set of functions described herein, such that the multiple processors together can perform the set of functions. Similarly, for example, the one or more memories 316 can include a single memory device or multiple memory devices configured to store instructions or parameters for performing one or more functions described herein. For example, the multiple memory devices can be configured to store the instructions or parameters for performing a certain subset of a set of functions described herein, such that the multiple memory devices together can store the instructions or parameters for the set of functions. The one or more processors 312, one or more memories 316, and one or more transceivers 302 may operate in conjunction with modem 340 and/or UE communicating component 342 for transmitting a BSR indicating a certain buffer size table used to encode a buffer size in the BSR, in accordance with aspects described herein.

In an aspect, the one or more processors 312 can include a modem 340 and/or can be part of the modem 340 that uses one or more modem processors. Thus, the various functions related to UE communicating component 342 may be included in modem 340 and/or processors 312 and, in an aspect, can be executed by a single processor, while in other aspects, different ones of the functions may be executed by a combination of two or more different processors. For example, in an aspect, the one or more processors 312 may include any one or any combination of a modem processor, or a baseband processor, or a digital signal processor, or a transmit processor, or a receiver processor, or a transceiver processor associated with transceiver 302. In other aspects, some of the features of the one or more processors 312 and/or modem 340 associated with UE communicating component 342 may be performed by transceiver 302.

Also, memory/memories 316 may be configured to store data used herein and/or local versions of applications 375 or UE communicating component 342 and/or one or more of its subcomponents being executed by at least one processor 312. Memory/memories 316 can include any type of computer-readable medium usable by a computer or at least one processor 312, such as random access memory (RAM), read only memory (ROM), tapes, magnetic discs, optical discs, volatile memory, non-volatile memory, and any combination thereof. In an aspect, for example, memory/memories 316 may be a non-transitory computer-readable storage medium that stores one or more computer-executable codes defining UE communicating component 342 and/or one or more of its subcomponents, and/or data associated therewith, when UE 104 is operating at least one processor 312 to execute UE communicating component 342 and/or one or more of its subcomponents.

Transceiver 302 may include at least one receiver 306 and at least one transmitter 308. Receiver 306 may include hardware, firmware, and/or software code executable by a processor for receiving data, the code comprising instructions and being stored in a memory (e.g., computer-readable medium). Receiver 306 may be, for example, a radio frequency (RF) receiver. In an aspect, receiver 306 may receive signals transmitted by at least one base station 102. Additionally, receiver 306 may process such received signals, and also may obtain measurements of the signals, such as, but not limited to, Ec/Io, signal-to-noise ratio (SNR), reference signal received power (RSRP), received signal strength indicator (RSSI), etc. Transmitter 308 may include hardware, firmware, and/or software code executable by a processor for transmitting data, the code comprising instructions and being stored in a memory (e.g., computer-readable medium). A suitable example of transmitter 308 may including, but is not limited to, an RF transmitter.

Moreover, in an aspect, UE 104 may include RF front end 388, which may operate in communication with one or more antennas 365 and transceiver 302 for receiving and transmitting radio transmissions, for example, wireless communications transmitted by at least one base station 102 or wireless transmissions transmitted by UE 104. RF front end 388 may be connected to one or more antennas 365 and can include one or more low-noise amplifiers (LNAs) 390, one or more switches 392, one or more power amplifiers (Pas) 398, and one or more filters 396 for transmitting and receiving RF signals.

In an aspect, LNA 390 can amplify a received signal at a desired output level. In an aspect, each LNA 390 may have a specified minimum and maximum gain values. In an aspect, RF front end 388 may use one or more switches 392 to select a particular LNA 390 and its specified gain value based on a desired gain value for a particular application.

Further, for example, one or more PA(s) 398 may be used by RF front end 388 to amplify a signal for an RF output at a desired output power level. In an aspect, each PA 398 may have specified minimum and maximum gain values. In an aspect, RF front end 388 may use one or more switches 392 to select a particular PA 398 and its specified gain value based on a desired gain value for a particular application.

Also, for example, one or more filters 396 can be used by RF front end 388 to filter a received signal to obtain an input RF signal. Similarly, in an aspect, for example, a respective filter 396 can be used to filter an output from a respective PA 398 to produce an output signal for transmission. In an aspect, each filter 396 can be connected to a specific LNA 390 and/or PA 398. In an aspect, RF front end 388 can use one or more switches 392 to select a transmit or receive path using a specified filter 396, LNA 390, and/or PA 398, based on a configuration as specified by transceiver 302 and/or processor 312.

As such, transceiver 302 may be configured to transmit and receive wireless signals through one or more antennas 365 via RF front end 388. In an aspect, transceiver may be tuned to operate at specified frequencies such that UE 104 can communicate with, for example, one or more base stations 102 or one or more cells associated with one or more base stations 102. In an aspect, for example, modem 340 can configure transceiver 302 to operate at a specified frequency and power level based on the UE configuration of the UE 104 and the communication protocol used by modem 340.

In an aspect, modem 340 can be a multiband-multimode modem, which can process digital data and communicate with transceiver 302 such that the digital data is sent and received using transceiver 302. In an aspect, modem 340 can be multiband and be configured to support multiple frequency bands for a specific communications protocol. In an aspect, modem 340 can be multimode and be configured to support multiple operating networks and communications protocols. In an aspect, modem 340 can control one or more components of UE 104 (e.g., RF front end 388, transceiver 302) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, UE communicating component 342 can optionally include a BSR encoding component 352 for encoding at least a portion of a BSR, such as one or more buffer sizes for one or more buffers at the UE 104 (e.g., buffers stored in memory/memories 316 and/or related to one or more applications 375), and/or a buffer size table component 354 for using a buffer size table for encoding the one or more buffer sizes, generating the buffer size table, selecting the buffer size table from multiple configured or generated buffer size tables, etc., in accordance with aspects described herein.

In an aspect, the processor(s) 312 may correspond to one or more of the processors described in connection with the UE in FIG. 7. Similarly, the memory/memories 316 may correspond to the memory/memories described in connection with the UE in FIG. 7.

Figure 4:
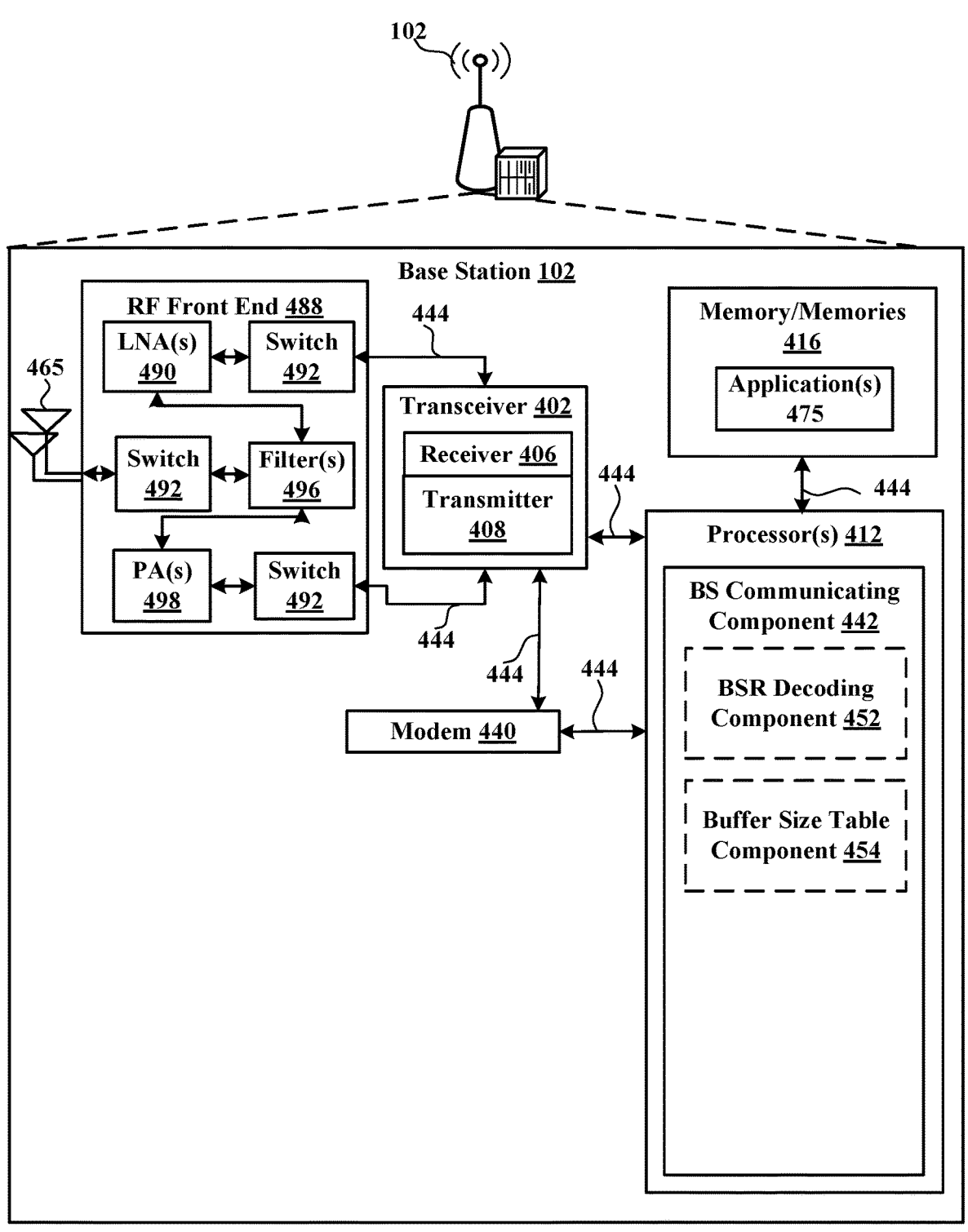
FIG. 4 is a block diagram illustrating an example of a base station, in accordance with various aspects of the present disclosure.

Referring to FIG. 4, one example of an implementation of base station 102 (e.g., a base station 102 and/or gNB 180, as described above) may include a variety of components, some of which have already been described above, but including components such as one or more processors 412 and one or more memories 416 and one or more transceivers 402 in communication via one or more buses 444. For example, the one or more processors 412 can include a single processor or multiple processors configured to perform one or more functions described herein. For example, the multiple processors can be configured to perform a certain subset of a set of functions described herein, such that the multiple processors together can perform the set of functions. Similarly, for example, the one or more memories 416 can include a single memory device or multiple memory devices configured to store instructions or parameters for performing one or more functions described herein. For example, the multiple memory devices can be configured to store the instructions or parameters for performing a certain subset of a set of functions described herein, such that the multiple memory devices together can store the instructions or parameters for the set of functions. The one or more processors 412, one or more memories 416, and one or more transceivers 402 may operate in conjunction with modem 440 and BS communicating component 442 for decoding a buffer size from a BSR from a UE based on a buffer size table indicated by the BSR, in accordance with aspects described herein.

The transceiver 402, receiver 406, transmitter 408, one or more processors 412, memory/memories 416, applications 475, buses 444, RF front end 488, LNAs 490, switches 492, filters 496, Pas 498, and one or more antennas 465 may be the same as or similar to the corresponding components of UE 104, as described above, but configured or otherwise programmed for base station operations as opposed to UE operations.

In an aspect, BS communicating component 442 can optionally include a BSR decoding component 452 for decoding at least a portion of a BSR, such as one or more buffer sizes indicated in the BSR (e.g., buffer sizes of one or more buffers at the UE 104 that store data for one or more applications), and/or a buffer size table component 454 for using a buffer size table for decoding the one or more buffer sizes, generating the buffer size table, selecting the buffer size table from multiple configured or generated buffer size tables, etc., in accordance with aspects described herein.

In an aspect, the processor(s) 412 may correspond to one or more of the processors described in connection with the base station in FIG. 7. Similarly, the memory/memories 416 may correspond to the memory/memories described in connection with the base station in FIG. 7.

FIG. 5 illustrates a flow chart of an example of a method 500 for encoding and transmitting a BSR, in accordance with aspects described herein. In an example, a UE 104 can perform the functions described in method 500 using one or more of the components described in FIGS. 1 and 3.

In method 500, at Block 502, a BSR for a buffer that stores data from an application can be encoded based on a buffer size table. In an aspect, BSR encoding component 352, e.g., in conjunction with processor(s) 312, memory/memories 316, transceiver 302, UE communicating component 342, etc., can encode, based on a buffer size table, a BSR for a buffer that stores data from an application. For example, UE 104 can include one or more buffers for one or more applications 375 executing on the UE 104. The one or more applications 375 may generate data for wireless communication and/or receive data via wireless communication with a network node (e.g., a base station 102 or gNB, a portion of a disaggregated base station 102 or gNB, etc.). The one or more buffers may be stored in memory/memories 316 and may be associated with a MAC layer at the UE 104. As such, the one or more buffers may store MAC layer data for transmitting via modem 340, one or more RF components, etc. In an example, BSR encoding component 352 can generate a BSR and/or can encode at least a portion of the BSR, such as a buffer size of one or more buffers reported in the BSR. For example, the buffer size may include a size of data stored in the one or more buffers and/or otherwise available for transmission. In examples described herein, BSR encoding component 352 can encode the buffer size as a code point that corresponds to a buffer size, where the code points can be defined or otherwise determined or generated based on a formula.

As described, in some examples, a formula similar to the following may be used to define buffer sizes corresponding to multiple code points for indicating in the BSR:

$$B_k = \left\lceil B_{min} \cdot (1 + p)^k \right\rceil \text{ where } p = (B_{max}/B_{min})^{1/(N-1)} - 1$$

As described, $B_k$ can be the buffer size corresponding to code point k and as such BSR encoding component 352 can indicate the code point k in the BSR to specify buffer size $B_k$. The network node can also be configured with a similar formula for the buffer size table such that when the code point k to the corresponding buffer size $B_k$. However, the specific formula above or certain values of the minimum reported buffer size, $B_{min}$, may cause the step size for larger values for the buffer size to be exponentially large, which may result in wasting resources for a corresponding UL grant, processing resources for padding TBs to reach the indicated buffer size, resources for transmitting the padded TBs, etc. As such, for example, BSR encoding component 352 can encode a buffer size for one or more buffers based on a different buffer size table (e.g., other than legacy buffer size table(s) currently defined in a wireless communication technology, such as 5G NR).

In one example, BSR encoding component 352 can use or generate a buffer size table having a larger value for $B_{min}$, which can improve granularity of larger sizes as compared to a buffer size table having a smaller value for $B_{min}$. For example, in 5G NR, $B_{min}$ can be 10 bytes, and the buffer size table (e.g., sizes $B_k$ for each codepoint k) can be generated using the formula above and based on $B_{min}=10$ bytes. For applications having higher throughput, such as XR applications, BSR encoding component 352 can use or generate a different buffer size table having a larger value for $B_{min}$, such as $B_{min}=100$ kilobytes, which would have larger buffer sizes at the smaller values of codepoint k, resulting in better granularity for these larger buffer sizes as compared to the buffer size table generated from $B_{min}=10$ bytes. In one example, a network node can configure the UE 104 with one or more larger minimum reported buffer sizes for use in using or generating the alternative buffer size tables.

In method 500, optionally at Block 504, a configuration indicating at least a larger minimum reported buffer size for the buffer size table can be received. In an aspect, buffer size table component 354, e.g., in conjunction with processor(s) 312, memory/memories 316, transceiver 302, UE communicating component 342, etc., can receive (e.g., from the network node) the configuration indicating at least the larger minimum reported buffer size for the buffer size table. In an example, buffer size table component 354 can receive the configuration in radio resource control (RRC) signaling, MAC-CE, downlink control information (DCI), etc. from the network node. For example, buffer size table component 354 can receive, from the network node, a configuration indicating $B_{min}=100$ kilobytes for one buffer size table. In another example, the configuration may also indicate a maximum reported buffer size for the buffer size table. Moreover, for example, the configuration may indicate parameters for multiple buffer size tables, each for a range of buffer sizes. In one specific example, the configuration can indicate a buffer size table index or identifier, an associated minimum reported buffer size, an associated maximum reported buffer size, a LCID to use in the BSR for indicating the buffer size table utilized, and/or the like. For example, the configuration may indicate:

| buffer size Table Index | $B_{min}$ | $B_{max}$ |
|---|---|---|
| 1 | B1 | B2 |
| 2 | B2 + 1 | B3 |
| . . . | . . . | . . . | which can cover the range of buffer sizes B1 to B2, B2+1 to B3, etc. In an example, buffer size table component 354 can use or generate the desired buffer size table based on a range of buffer sizes covered by the buffer size table (as indicated in the configuration) and the buffer size of the buffer for which the BSR is being encoded.

In another example, in using or generating a buffer size table, an encoding formula that makes step size decrease with buffer size can be used. For example, buffer size table component 354 can use or generate a buffer size table according to a formula similar to the following:

$$B_k = B_{min} + (B_{max} - B_{min}) * \left(1 - e^{-A*k}\right)$$

where k is the code point and A is a constant that controls how fast the step size decays as k increases. In an example, a network node can configure the buffer size tables generated using such a formula or may configure parameters for the UE 104 to use in generating buffer size tables. For example, the network node can configure A, configure an indication to generate the buffer size tables using the formula and A for larger buffer sizes, etc.

In method 500, optionally at Block 506, a configuration indicating multiple buffer size tables each corresponding to a range of buffer sizes can be received. In an aspect, buffer size table component 354, e.g., in conjunction with processor(s) 312, memory/memories 316, transceiver 302, UE communicating component 342, etc., can receive the configuration (e.g., from the network node) indicating multiple buffer size tables each corresponding to the range of buffer sizes. In an example, buffer size table component 354 can receive the configuration in RRC signaling, MAC-CE, DCI, etc. from the network node. For example, the configuration may specify the buffer size tables or parameters for generating the buffer size tables, such as the formula to use, the constant A, etc., as related to each of a range of buffer sizes and/or a corresponding LCID to indicate which buffer size table is used. In an example, buffer size table component 354 can use or generate the desired buffer size table based on a range of buffer sizes covered by the buffer size table (as indicated in the configuration) and the buffer size of the buffer for which the BSR is being encoded.

In another example, in using or generating a buffer size table, a mechanism that decreases the dynamic range of the buffer size before encoding can be used. For example, buffer size table component 354 can decrease the dynamic range of buffer size using a mechanism similar to companding used for signal processing and communication in telecommunication systems. For example, buffer size table component 354 can prepare a new buffer size table based on first compressing an original buffer size by applying it to a function, such as μ-law or A-law function. This "compression" can reduce the very large range of buffer size down to the range [0, 1]. An example of μ-law function can include:

$$C = \frac{\ln(1 + uxBS)}{\ln(1 + BS)}$$

where buffer size is a range of buffer sizes, which can be configured by the network node, and μ is a constant, which can be configured by the network node, to control how fast the step size decays as buffer size increases. In this example, buffer size table component 354 can sample the output of the first step, C, by a uniform quantitizer (e.g., for 8-bit BSR, the quantitizer can have 256 encoding points) and produces $D_k$, which can be in the range of [0,1]. The new buffer size table can tabulate each encoding index k to its corresponding buffer size $B_k$. In this example, to encode or report a buffer size, BSR encoding component 352 can look up its corresponding encoding index k, and can report k to the network node. After receiving k, as described further herein, the network node can calculate $D_k = k/256$ for 8-bit BSR (e.g., or $D_k = k/32$ for 5-bit BSR), and can use the "decompression" function to produce the original value of buffer size.

In an example, the network node may configure multiple such tables, each of which covers a particular range of buffer sizes. For example, the network node can configure the range of buffer sizes, associated identifier, correspond LCID, etc. As described, for example, (e.g., at Block 506), buffer size table component 354 can receive a configuration indicating the multiple buffer size tables each corresponding to a range of buffer sizes. In an example, buffer size table component 354 can use or generate the desired buffer size table based on a range of buffer sizes covered by the buffer size table (as indicated in the configuration) and the buffer size of the buffer for which the BSR is being encoded at least in part by using the process described above using the companding function for the corresponding range of buffer sizes.

In this regard, in an example in method 500, optionally at Block 508, the buffer size table can be generated based on a range of buffer sizes. In an aspect, buffer size table component 354, e.g., in conjunction with processor(s) 312, memory/memories 316, transceiver 302, UE communicating component 342, etc., can generate the buffer size table based on the range of buffer sizes. For example, as described above, buffer size table component 354 can use the companding function to generate the buffer size table based on the range of buffer sizes, where the range of buffer sizes can be selected based on the buffer size of the buffer at the UE 104. In the other examples described above, buffer size table component 354 can generate the buffer size table to use based on the selected range of buffer sizes and the corresponding parameters (e.g., the minimum and/or maximum reported buffer sizes, the constant A, and/or the like).

In method 500, at Block 510, the BSR indicating a LCID that corresponds to a buffer size table can be transmitted to a network node. In an aspect, UE communicating component 342, e.g., in conjunction with processor(s) 312, memory/memories 316, transceiver 302, etc., can transmit, to the network node, the BSR indicating the LCID that corresponds to the buffer size table. For example, each new buffer size table can be assigned a new unique LCID (e.g., in a configuration as described). In this regard, the network node can determine which buffer size table the UE used for the report based on the LCID in the MAC subheader of the BSR MAC-CE transmitted by the UE. As described, for example, the configuration from the network node can indicate the LCID to use for each buffer size table or for each set of parameters used to generate the buffer size table (e.g., for the minimum reported buffer size, for a corresponding constant A, for a corresponding range of buffer sizes, etc.).

In one example, the network node can configure a policy for each of the one or more LCGs on which buffer size table(s) it should use to report buffer size. For example, the policy can indicate whether to use a buffer size table currently defined in 5G NR or one of the new buffer size tables described herein that have lower step size for larger buffer sizes. In an example, the policy may indicate one or more buffer size tables depending on how the buffer size tables are encoded. For example, if a buffer size table covers an entire range of buffer size that may be generated by the specific application using the buffer, BSR encoding component 352 can use the table configured in the policy. If, however, multiple buffer size tables are used and each of the buffer size tables covers a certain range of buffer size, BSR encoding component 352 can select the buffer size table in the policy that covers the buffer size to be reported, as described herein.

In another example, a policy can mix use of a buffer size table currently defined in 5G NR and one of the new buffer size tables described herein that have lower step size for larger buffer sizes. For example, the policy can indicate to use the currently defined (e.g., legacy) buffer size table for a buffer size less than a threshold, but use one of the new buffer size tables for buffer size that achieves the threshold. In an example, the network node can indicate the threshold in the policy or another configuration transmitted to the UE 104. In an example, the policy can indicate multiple thresholds and corresponding buffer size tables to use. For example, the policy can indicate if buffer size is less than a first threshold, BSR encoding component 352 can use buffer size table 1, if buffer size achieves the first threshold but is less than a second threshold, BSR encoding component 352 can use buffer size table 2, and so on.

In method 500, optionally at Block 512, a configuration of a policy for a LCG corresponding to the application can be received from the network node. In an aspect, BSR encoding component 352, e.g., in conjunction with processor(s) 312, memory/memories 316, transceiver 302, UE communicating component 342, etc., can receive, from the network node, the configuration of the policy for the LCG corresponding to the application. As described, the policy can indicate, for a LCG, rules, parameters, thresholds, etc. for using certain buffer size tables, whether a buffer size table currently defined in 5G NR and/or one or more of the new buffer size tables described herein that have lower step size for larger buffer sizes. In an example, BSR encoding component 352 can select a buffer size table to use for encoding the buffer size based on the policy, as described above, and/or based on identifying which policy applies to a LCG having a logical channel used for transmitting data from the corresponding application 375.

FIG. 6 illustrates a flow chart of an example of a method 600 for receiving and decoding a BSR, in accordance with aspects described herein. In an example, a network node, such as a base station 102 or gNB, a portion of a disaggregated base station 102 or gNB (e.g., a CU, DU, RU, etc.), and/or the like can perform the functions described in method 600 using one or more of the components described in FIGS. 1 and 4.

In method 600, at Block 602, a BSR indicating a LCID that corresponds to a buffer size table can be received for a UE. In an aspect, BS communicating component 442, e.g., in conjunction with processor(s) 412, memory/memories 416, transceiver 402, etc., can receive, for the UE (e.g., UE 104), the BSR indicating the LCID that corresponds to the buffer size table used to encode one or more buffer size values in the BSR. In an example, the BSR can be transmitted by the UE and received by the network node or one or more associated portions of the network node. The LCID can be a value used to indicate a new buffer size table or parameters used to generate the new buffer size table, as described herein. BS communicating component 442 can receive the BSR in a MAC-CE from the UE 104, which can indicate the buffer size of a MAC-layer buffer corresponding to a logical channel and/or an application executing on the UE. In an example, the buffer size table can include a newly defined buffer size table that has smaller step sizes for larger buffer size values, as described herein. In one example, the newly defined buffer size tables may be at least partially configured by the network node.

In one example, in method 600, optionally at Block 604, a configuration indicating at least a larger minimum reported buffer size for the buffer size table can be transmitted. In an aspect, buffer size table component 454, e.g., in conjunction with processor(s) 412, memory/memories 416, transceiver 402, BS communicating component 442, etc., can transmit the configuration indicating at least the larger minimum reported buffer size for the buffer size table. For example, buffer size table component 454 can transmit the configuration to the UE 104, which may indicate one or more larger minimum reported buffer sizes, which may be larger than a minimum reported buffer size for a buffer size table currently defined in 5G NR, as described. In one example, the configuration may indicate minimum reported buffer sizes and/or maximum reported buffer sizes for each of multiple ranges of buffer sizes. As described, this may enable the UE 104 (and/or the network node) to generate the associated buffer table sizes based on a formula, such as:

$$B_k = \left\lceil B_{min} \cdot (1 + p)^k \right\rceil \text{ where } p = (B_{max}/B_{min})^{1/(N-1)} - 1$$

where $B_{min}$ and $B_{max}$ are specified in the configuration for one or more buffer size tables.

In another example, in method 600, optionally at Block 606, a configuration indicating multiple buffer size tables each corresponding to a block size can be transmitted. In an aspect, buffer size table component 454, e.g., in conjunction with processor(s) 412, memory/memories 416, transceiver 402, BS communicating component 442, etc., can transmit the configuration indicating the multiple buffer size tables each corresponding to a block size. For example, buffer size table component 454 can transmit the configuration to the UE 104, which may indicate a function, a parameters (e.g., a constant A that controls how fast the step size decays as k increases) or other information used to generate buffer size tables for each range of buffer sizes. As described, for example, the configuration may specify, or may indicate parameters to be used with, an encoding formula such as:

$$B_k = B_{min} + (B_{max} - B_{min}) * \left(1 - e^{-A*k}\right)$$

or another formula that results in step size decreasing with buffer size. In yet another example, the configuration can indicate buffer size ranges that can be used in a companding function to generate code points for indicating buffer size, as described above. The UE 104, in any case, can use the configuration to generate or use a buffer size table to encode a buffer size for a buffer as a code point in the BSR.

In one example, in method 600, optionally at Block 608, the buffer size table can be generated based on a range of buffer sizes. In an aspect, buffer size table component 454, e.g., in conjunction with processor(s) 412, memory/memories 416, transceiver 402, BS communicating component 442, etc., can generate the buffer size table or multiple buffer size tables based on a range or ranges of buffer sizes, which may be based on parameters indicated in the configuration.

In method 600, at Block 610, the BSR for a buffer that stores data for an application at the UE can be decoded based on the buffer size table. In an aspect, BSR decoding component 452, e.g., in conjunction with processor(s) 412, memory/memories 416, transceiver 402, BS communicating component 442, etc., can decode, based on the buffer size table, the BSR for the buffer that stores data for the application at the UE. In an example, BSR decoding component 452 may determine which of multiple buffer size tables are used by the UE to encode the buffer size, which may be based on the identifier in the BSR (as described in Block 602). For example, the BSR can indicate a LCID or other identifier that can correspond to a certain buffer size table (or parameters for generating a certain buffer size table), and BSR decoding component 452 can determine the buffer size table based on the parameter. BSR decoding component 452 can determine the encoded buffer size based on the code point indicated in the BSR and the corresponding buffer size table, as described above.

In method 600, at Block 612, an uplink grant for transmitting the data can be transmitted for the UE and based on the BSR. In an aspect, BS communicating component 442, e.g., in conjunction with processor(s) 412, memory/memories 416, transceiver 402, etc., can transmit, for the UE and based on the BSR, the uplink grant for transmitting the data. For example, BS communicating component 442 can generate the uplink grant based on the buffer size indicated in the BSR, which can include generating an uplink grant with an amount of resources sufficient for transmitting the contents of the buffer based on the buffer size indicated in the BSR. BS communicating component 442 can transmit the uplink grant to the UE in DCI or other signaling in a downlink control channel or shared channel.

In method 600, optionally at Block 614, a configuration of a policy for a LCG corresponding to the application can be transmitted. In an aspect, BSR decoding component 452, e.g., in conjunction with processor(s) 412, memory/memories 416, transceiver 402, BS communicating component 442, etc., can transmit (e.g., to the UE) the configuration of the policy for the LCG corresponding to the application. As described, the policy can indicate, for a LCG, rules, parameters, thresholds, etc. for using certain buffer size tables, whether a buffer size table currently defined in 5G NR and/or one or more of the new buffer size tables described herein that have lower step size for larger buffer sizes, as described above.

Figure 7:
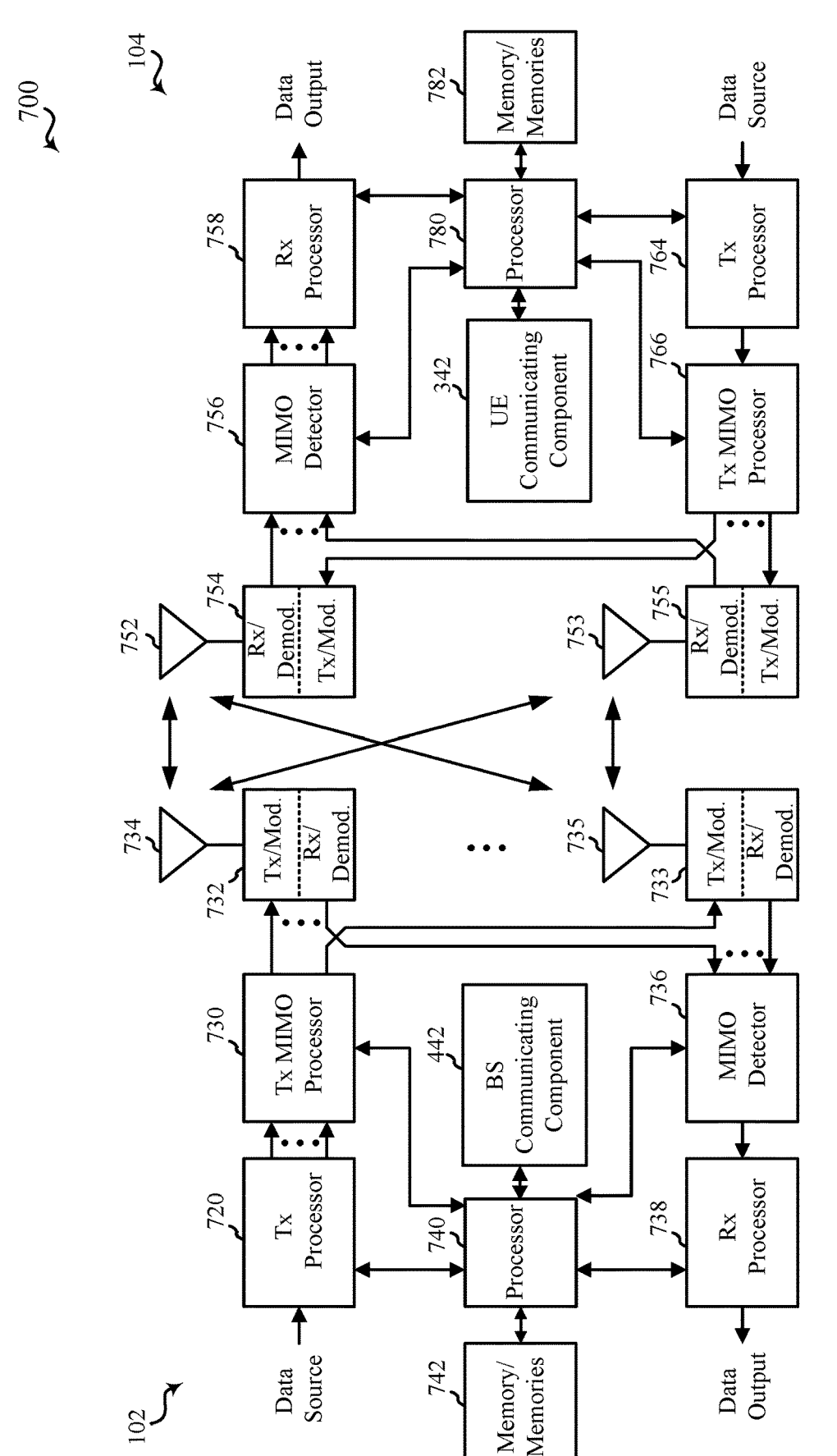
FIG. 7 is a block diagram illustrating an example of a multiple-input multiple-output (MIMO) communication system including a base station and a UE, in accordance with various aspects of the present disclosure.

FIG. 7 is a block diagram of a MIMO communication system 700 including a base station 102 and a UE 104. The MIMO communication system 700 may illustrate aspects of the wireless communication access network 100 described with reference to FIG. 1. The base station 102 may be an example of aspects of the base station 102 described with reference to FIG. 1. The base station 102 may be equipped with antennas 734 and 735, and the UE 104 may be equipped with antennas 752 and 753. In the MIMO communication system 700, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 720 may receive data from a data source. The transmit processor 720 may process the data. The transmit processor 720 may also generate control symbols or reference symbols. A transmit MIMO processor 730 may perform spatial processing (e.g., precoding) on data symbols, control symbols, or reference symbols, if applicable, and may provide output symbol streams to the transmit modulator/demodulators 732 and 733. Each modulator/demodulator 732 through 733 may process a respective output symbol stream (e.g., for OFDM, etc.) to obtain an output sample stream. Each modulator/demodulator 732 through 733 may further process (e.g., convert to analog, amplify, filter, and upconvert) the output sample stream to obtain a DL signal. In one example, DL signals from modulator/demodulators 732 and 733 may be transmitted via the antennas 734 and 735, respectively.

The UE 104 may be an example of aspects of the UEs 104 described with reference to FIGS. 1 and 3. At the UE 104, the UE antennas 752 and 753 may receive the DL signals from the base station 102 and may provide the received signals to the modulator/demodulators 754 and 755, respectively. Each modulator/demodulator 754 through 755 may condition (e.g., filter, amplify, downconvert, and digitize) a respective received signal to obtain input samples. Each modulator/demodulator 754 through 755 may further process the input samples (e.g., for OFDM, etc.) to obtain received symbols. A MIMO detector 756 may obtain received symbols from the modulator/demodulators 754 and 755, perform MIMO detection on the received symbols, if applicable, and provide detected symbols. A receive (Rx) processor 758 may process (e.g., demodulate, deinterleave, and decode) the detected symbols, providing decoded data for the UE 104 to a data output, and provide decoded control information to a processor 780, or memory/memories 782.

The processor 780 may in some cases execute stored instructions to instantiate a UE communicating component 342 (see e.g., FIGS. 1 and 3).

On the uplink (UL), at the UE 104, a transmit processor 764 may receive and process data from a data source. The transmit processor 764 may also generate reference symbols for a reference signal. The symbols from the transmit processor 764 may be precoded by a transmit MIMO processor 766 if applicable, further processed by the modulator/demodulators 754 and 755 (e.g., for single carrier-FDMA, etc.), and be transmitted to the base station 102 in accordance with the communication parameters received from the base station 102. At the base station 102, the UL signals from the UE 104 may be received by the antennas 734 and 735, processed by the modulator/demodulators 732 and 733, detected by a MIMO detector 736 if applicable, and further processed by a receive processor 738. The receive processor 738 may provide decoded data to a data output and to the processor 740 or memory/memories 742.

The processor 740 may in some cases execute stored instructions to instantiate a BS communicating component 442 (see e.g., FIGS. 1 and 4).

The components of the UE 104 may, individually or collectively, be implemented with one or more ASICs adapted to perform some or all of the applicable functions in hardware. Each of the noted modules may be a means for performing one or more functions related to operation of the MIMO communication system 700. Similarly, the components of the base station 102 may, individually or collectively, be implemented with one or more application specific integrated circuits (ASICs) adapted to perform some or all of the applicable functions in hardware. Each of the noted components may be a means for performing one or more functions related to operation of the MIMO communication system 700.

The following aspects are illustrative only and aspects thereof may be combined with aspects of other embodiments or teaching described herein, without limitation.

Aspect 1 is a method for wireless communication at a UE including encoding, based on a buffer size table, a buffer status report for a buffer that stores data from an application, and transmitting, to a network node, the buffer status report indicating a logical channel identifier that corresponds to the buffer size table.

In Aspect 2, the method of Aspect 1 includes where the buffer size table includes a larger minimum reported buffer size value than a second buffer size table, where the buffer size table covers a range of buffer sizes less than the second buffer size table, where the buffer size table includes a maximum buffer size less than or equal to the second buffer size table, and where encoding the buffer status report is based on a function of the larger minimum reported buffer size.

In Aspect 3, the method of Aspect 2 includes receiving a configuration indicating at least the larger minimum reported buffer size for the buffer size table.

In Aspect 4, the method of any of Aspects 2 or 3 includes receiving a configuration indicating multiple buffer size tables and corresponding larger minimum reported buffer sizes than the second buffer size table, including the larger minimum reported buffer size for the buffer size table, where the buffer size table is based at least in part on the multiple buffer size tables and a data throughput of the application.

In Aspect 5, the method of any of Aspects 1 to 4 includes where a step size of buffer sizes in the buffer size table decreases as the buffer sizes increase.

In Aspect 6, the method of any of Aspects 1 to 5 includes receiving a configuration indicating multiple buffer size tables each corresponding to a block size, where a step size of buffer sizes in each of the multiple buffer size tables decreases as the buffer sizes increases, and where the buffer size table is based at least in part on the multiple buffer size tables and the block size covered by the buffer size table.

In Aspect 7, the method of any of Aspects 1 to 6 includes generating, using a companding function, the buffer size table based on a range of buffer sizes, where the B SR includes an encoding index based on the companding function.

In Aspect 8, the method of Aspect 7 includes where generating the buffer size table includes compressing an original range of buffer sizes to a compressed range, and sampling the compressed range using a uniform quantizer to generate multiple buffer size tables corresponding to each of a plurality of encoding indices including the encoding index.

In Aspect 9, the method of Aspect 8 includes where the buffer size table is based at least in part on the multiple buffer size tables and a block size covered by the buffer size table.

In Aspect 10, the method of any of Aspects 1 to 9 includes receiving, from the network node, a configuration of a policy for a LCG corresponding to the application, where the buffer size table is based on the policy and the LCG corresponding to the application.

In Aspect 11, the method of Aspect 10 includes where the buffer size table is indicated in the configuration, where the buffer size table covers an entire range of buffer sizes for the application.

In Aspect 12, the method of any of Aspects 10 or 11 includes where the policy indicates to use the buffer size for a block of buffer size corresponding to a size of the buffer.

In Aspect 13, the method of any of Aspects 10 to 12 includes where the policy indicates, when a size of the buffer exceeds a threshold side, to use the buffer size table instead of a second buffer size table having a smaller minimum reported buffer size value than the buffer size table.

Aspect 14 is a method for wireless communication at a network node including receiving, for a UE, a buffer status report indicating a logical channel identifier that corresponds to a buffer size table, decoding, based on the buffer size table, the buffer status report for a buffer that stores data from an application at the UE, and transmitting, for the UE and based on the buffer status report, an uplink grant for transmitting the data.

In Aspect 15, the method of Aspect 14 includes where the buffer size table includes a larger minimum reported buffer size value than a second buffer size table, where the buffer size table covers a range of buffer sizes less than the second buffer size table, where the buffer size table includes a maximum buffer size less than or equal to the second buffer size table, and where decoding the buffer status report is based on a function of the larger minimum reported buffer size.

In Aspect 16, the method of Aspect 15 includes transmitting a configuration indicating at least the larger minimum reported buffer size for the buffer size table.

In Aspect 17, the method of any of Aspects 15 or 16 includes transmitting a configuration indicating multiple buffer size tables and corresponding larger minimum reported buffer sizes than the second buffer size table, including the larger minimum reported buffer size for the buffer size table.

In Aspect 18, the method of any of Aspects 14 to 17 includes where a step size of buffer sizes in the buffer size table decreases as the buffer sizes increase.

In Aspect 19, the method of any of Aspects 14 to 18 includes transmitting a configuration indicating multiple buffer size tables each corresponding to a block size, where a step size of buffer sizes in each of the multiple buffer size tables decreases as the buffer sizes increases.

In Aspect 20, the method of any of Aspects 14 to 19 includes where the buffer status report indicates an encoding index, and where decoding the buffer status report includes determining the buffer size based on the encoding index and the buffer size table generated using on a companding function for a range of buffer sizes.

In Aspect 21, the method of Aspect 20 includes where generating the buffer size table includes computing a compressed range of buffer sizes based on the encoding index, and decompressing the compressed range of buffer sizes to an original range of buffer sizes.

In Aspect 22, the method of any of Aspects 14 to 21 includes transmitting, for the UE, a configuration of a policy for a LCG corresponding to the application, where the policy indicates multiple buffer size tables for the LCG including the buffer size table corresponding to the application.

In Aspect 23, the method of Aspect 22 includes where the multiple buffer size tables for the LCG are each associated with a block size for the buffer.

In Aspect 24, the method of Aspect 22 includes where the policy further indicates a second buffer size table associated with a smaller minimum reported buffer size than the buffer size table, and a threshold size for using one or more of the buffer size table or the second buffer size table.

Aspect 25 is a method for wireless communication at a UE including encoding, based on a buffer size table, a buffer status report for a buffer that stores data from an application, where the buffer size table is associated with a wireless communication technology and has a smaller step size for buffer sizes between two encoding points than a different buffer size table defined in the wireless communication technology, and transmitting, to a network node, the buffer status report indicating a logical channel identifier that corresponds to the buffer size table.

In Aspect 26, the method of Aspect 25 includes receiving, from the network node, a configuration for a LCG corresponding to the application, where the buffer size table is based on the LCG corresponding to the application.

In Aspect 27, the method of Aspect 26 includes where the buffer size table is indicated in the configuration.

In Aspect 28, the method of any of Aspects 26 or 27 includes where the configuration further includes a policy for the LCG indicating to use the buffer size for a block of buffer size corresponding to a size of the buffer.

In Aspect 29, the method of any of Aspects 26 to 28 includes where the configuration further includes a policy for the LCG indicating, when a size of the buffer exceeds a threshold side, to use the buffer size table instead of a second buffer size table having a smaller minimum reported buffer size value than the buffer size table.

In Aspect 30, the method of any of Aspects 25 to 29 includes where the buffer size table is associated with extended reality applications.

In Aspect 31, the method of Aspect 30 includes where the buffer size table includes an eight-bit buffer size.

In Aspect 32, the method of any of Aspects 25 to 31 includes where the buffer size table includes a larger minimum reported buffer size value than the different buffer size table, where the buffer size table covers a range of buffer sizes less than the different buffer size table, where the buffer size table includes a maximum buffer size less than or equal to the different buffer size table, and where encoding the buffer status report is based on a function of the larger minimum reported buffer size.

In Aspect 33, the method of Aspect 32 includes receiving a configuration indicating at least the larger minimum reported buffer size for the buffer size table.

In Aspect 34, the method of any of Aspects 32 or 33 includes receiving a configuration indicating multiple buffer size tables and corresponding larger minimum reported buffer sizes than a different buffer size table, including the larger minimum reported buffer size for the buffer size table, where the buffer size table is based at least in part on the multiple buffer size tables and a data throughput of the application.

In Aspect 35, the method of any of Aspects 25 to 34 includes where a step size of buffer sizes in the buffer size table decreases as the buffer sizes increase.

In Aspect 36, the method of any of Aspects 25 to 35 includes receiving a configuration indicating multiple buffer size tables each corresponding to a block size, where a step size of buffer sizes in each of the multiple buffer size tables decreases as the buffer sizes increases, and where the buffer size table is based at least in part on the multiple buffer size tables and the block size covered by the buffer size table.

In Aspect 37, the method of any of Aspects 25 to 36 includes generating, using a companding function, the buffer size table based on a range of buffer sizes, where the BSR includes an encoding index based on the companding function.

In Aspect 38, the method of Aspect 37 includes where generating the buffer size table includes compressing an original range of buffer sizes to a compressed range, and sampling the compressed range using a uniform quantizer to generate multiple buffer size tables corresponding to each of a plurality of encoding indices including the encoding index.

In Aspect 39, the method of Aspect 38 includes where the buffer size table is based at least in part on the multiple buffer size tables and a block size covered by the buffer size table.

Aspect 40 is a method for wireless communication at a network node including receiving, for a UE, a buffer status report indicating a logical channel identifier that corresponds to a buffer size table, decoding, based on the buffer size table, the buffer status report for a buffer that stores data from an application at the UE, where the buffer size table is associated with a wireless communication technology and has a smaller step size for buffer sizes between two encoding points than a different buffer size table defined in the wireless communication technology, and transmitting, for the UE and based on the buffer status report, an uplink grant for transmitting the data.

In Aspect 41, the method of Aspect 40 includes transmitting, for the UE, a configuration of a LCG corresponding to the application.

In Aspect 42, the method of Aspect 41 includes where the configuration includes a policy indicates multiple buffer size tables for the LCG including the buffer size table corresponding to the application, where the multiple buffer size tables for the LCG are each associated with a block size for the buffer.

In Aspect 43, the method of any of Aspects 41 or 42 includes where the configuration includes a policy that indicates a second buffer size table associated with a smaller minimum reported buffer size than the buffer size table, and a threshold size for using one or more of the buffer size table or the second buffer size table.

In Aspect 44, the method of any of Aspects 40 to 43 includes where the buffer size table is associated with extended reality applications.

In Aspect 45, the method of Aspect 44 includes where the buffer size table includes an eight-bit buffer size.

In Aspect 46, the method of any of Aspects 40 to 45 includes where the buffer size table includes a larger minimum reported buffer size value than the different buffer size table, where the buffer size table covers a range of buffer sizes less than the different buffer size table, where the buffer size table includes a maximum buffer size less than or equal to the different buffer size table, and where decoding the buffer status report is based on a function of the larger minimum reported buffer size.

In Aspect 47, the method of Aspect 46 includes transmitting a configuration indicating at least the larger minimum reported buffer size for the buffer size table.

In Aspect 48, the method of any of Aspects 46 or 47 includes transmitting a configuration indicating multiple buffer size tables and corresponding larger minimum reported buffer sizes than a different buffer size table, including the larger minimum reported buffer size for the buffer size table.

In Aspect 49, the method of any of Aspects 40 to 48 includes where a step size of buffer sizes in the buffer size table decreases as the buffer sizes increase.

In Aspect 50, the method of any of Aspects 40 to 49 includes transmitting a configuration indicating multiple buffer size tables each corresponding to a block size, where a step size of buffer sizes in each of the multiple buffer size tables decreases as the buffer sizes increases.

In Aspect 51, the method of any of Aspects 40 to 50 includes where the buffer status report indicates an encoding index, and where decoding the buffer status report includes determining the buffer size based on the encoding index and the buffer size table generated using on a companding function for a range of buffer sizes.

In Aspect 52, the method of Aspect 51 includes where generating the buffer size table includes computing a compressed range of buffer sizes based on the encoding index, and decompressing the compressed range of buffer sizes to an original range of buffer sizes.

Aspect 53 is an apparatus for wireless communication including one or more processors, a memory or memories coupled with the one or more processors, and instructions stored in the memory or memories and operable, when executed by the one or more processors, to cause the apparatus to perform any of the methods of Aspects 1 to 52.

Aspect 54 is an apparatus for wireless communication including means for performing any of the methods of Aspects 1 to 52.

Aspect 55 is one or more computer-readable media including code executable by one or more processors for wireless communications, the code including code for performing any of the methods of Aspects 1 to 52.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially programmed device, such as but not limited to a processor, a digital signal processor (DSP), an ASIC, a field programmable gate array (FPGA) or other programmable logic device, a discrete gate or transistor logic, a discrete hardware component, or any combination thereof designed to perform the functions described herein. A specially programmed processor may be a microprocessor, but in the alternative, the processor may be any conventional processor, controller, microcontroller, or state machine. A specially programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. An apparatus for wireless communication, comprising:
a transceiver;
one or more memories configured to, individually or in combination, store instructions; and
one or more processors communicatively coupled with the one or more memories, wherein the one or more processors are, individually or in combination, configured to execute the instructions to cause the apparatus to:
encode, based on a buffer size table, a buffer status report for a buffer that stores data from an application, wherein the buffer size table is associated with a wireless communication technology and has a smaller step size for buffer sizes between two encoding points than a different buffer size table defined in the wireless communication technology, wherein the buffer sizes in the buffer size table correspond to a function of at least a first minimum buffer size and a number of encoding points, and wherein different buffer sizes in the different buffer size table correspond to the function of at least a second minimum buffer size and the number of encoding points; and transmit, to a network node, the buffer status report indicating a logical channel identifier that corresponds to the buffer size table.

2. The apparatus of claim 1, wherein the one or more processors are, individually or in combination, configured to execute the instructions to cause the apparatus to receive, from the network node, a configuration for a logical channel group (LCG) corresponding to the application, wherein the buffer size table is based on the LCG corresponding to the application.

3. The apparatus of claim 2, wherein the buffer size table is indicated in the configuration.

4. The apparatus of claim 2, wherein the configuration further includes a policy for the LCG indicating to use a buffer size for a block of buffer size corresponding to a size of the buffer.

5. The apparatus of claim 2, wherein the configuration further includes a policy for the LCG indicating, when a size of the buffer exceeds a threshold side, to use the buffer size table instead of a second buffer size table having a smaller minimum reported buffer size value than the buffer size table.

6. The apparatus of claim 1, wherein the buffer size table is associated with extended reality applications.

7. The apparatus of claim 6, wherein the buffer size table includes an eight-bit buffer size.

8. The apparatus of claim 1, wherein the first minimum buffer size is larger than the second minimum buffer size, wherein the buffer size table covers a range of buffer sizes less than the different buffer size table, wherein the buffer size table includes a maximum buffer size less than or equal to the different buffer size table, and wherein encoding the buffer status report is based on a function of the first minimum buffer size.

9. The apparatus of claim 8, wherein the one or more processors are, individually or in combination, configured to execute the instructions to cause the apparatus to receive a configuration indicating at least the first minimum buffer size for the buffer size table.

10. The apparatus of claim 8, wherein the one or more processors are, individually or in combination, configured to execute the instructions to cause the apparatus to receive a configuration indicating multiple buffer size tables and corresponding larger minimum reported buffer sizes than the different buffer size table, including the first minimum buffer size for the buffer size table, wherein the buffer size table is based at least in part on the multiple buffer size tables and a data throughput of the application.

11. The apparatus of claim 1, wherein a step size of buffer sizes in the buffer size table decreases as the buffer sizes increase.

12. The apparatus of claim 1, wherein the one or more processors are, individually or in combination, configured to execute the instructions to cause the apparatus to receive a configuration indicating multiple buffer size tables each corresponding to a block size, wherein a step size of buffer sizes in each of the multiple buffer size tables decreases as the buffer sizes increases, and wherein the buffer size table is based at least in part on the multiple buffer size tables and the block size covered by the buffer size table.

13. The apparatus of claim 1, wherein the one or more processors are, individually or in combination, configured to execute the instructions to cause the apparatus to generate, using a companding function, the buffer size table based on a range of buffer sizes, wherein the buffer status report includes an encoding index based on the companding function.

14. The apparatus of claim 13, wherein the one or more processors are, individually or in combination, configured to execute the instructions to cause the apparatus to generate the buffer size table at least in part by compressing an original range of buffer sizes to a compressed range, and sampling the compressed range using a uniform quantizer to generate multiple buffer size tables corresponding to each of a plurality of encoding indices including the encoding index.

15. The apparatus of claim 14, wherein the buffer size table is based at least in part on the multiple buffer size tables and a block size covered by the buffer size table.

16. An apparatus for wireless communication, comprising:

a transceiver;

one or more memories configured to, individually or in combination, store instructions; and one or more processors communicatively coupled with the one or more memories, wherein the one or more processors are, individually or in combination, configured to execute the instructions to cause the apparatus to:

receive, for a user equipment (UE), a buffer status report indicating a logical channel identifier that corresponds to a buffer size table;

decode, based on the buffer size table, the buffer status report for a buffer that stores data from an application at the UE, wherein the buffer size table is associated with a wireless communication technology and has a smaller step size for buffer sizes between two encoding points than a different buffer size table defined in the wireless communication technology, wherein the buffer sizes in the buffer size table correspond to a function of at least a first minimum buffer size and a number of encoding points, and wherein different buffer sizes in the different buffer size table correspond to the function of at least a second minimum buffer size and the number of encoding points; and transmit, for the UE and based on the buffer status report, an uplink grant for transmitting the data.

17. The apparatus of claim 16, wherein the one or more processors are, individually or in combination, configured to execute the instructions to cause the apparatus to transmit, for the UE, a configuration of a logical channel group (LCG) corresponding to the application.

18. The apparatus of claim 17, wherein the configuration includes a policy indicates multiple buffer size tables for the LCG including the buffer size table corresponding to the application, wherein the multiple buffer size tables for the LCG are each associated with a block size for the buffer.

19. The apparatus of claim 17, wherein the configuration includes a policy that indicates a second buffer size table associated with a smaller minimum reported buffer size than the buffer size table, and a threshold size for using one or more of the buffer size table or the second buffer size table.

20. The apparatus of claim 16, wherein the buffer size table is associated with extended reality applications.

21. The apparatus of claim 20, wherein the buffer size table includes an eight-bit buffer size.

22. The apparatus of claim 16, wherein the first minimum buffer size is larger than the second minimum buffer size, wherein the buffer size table covers a range of buffer sizes less than the different buffer size table, wherein the buffer size table includes a maximum buffer size less than or equal to the different buffer size table, and wherein decoding the buffer status report is based on a function of the first minimum buffer size.

23. The apparatus of claim 22, wherein the one or more processors are, individually or in combination, configured to execute the instructions to cause the apparatus to transmit a configuration indicating at least the first minimum buffer size for the buffer size table.

24. The apparatus of claim 22, wherein the one or more processors are, individually or in combination, configured to execute the instructions to cause the apparatus to transmit a configuration indicating multiple buffer size tables and corresponding larger minimum reported buffer sizes than a different buffer size table, including the first minimum buffer size for the buffer size table.

25. The apparatus of claim 16, wherein a step size of buffer sizes in the buffer size table decreases as the buffer sizes increase.

26. The apparatus of claim 16, wherein the one or more processors are, individually or in combination, configured to execute the instructions to cause the apparatus to transmit a configuration indicating multiple buffer size tables each corresponding to a block size, wherein a step size of buffer sizes in each of the multiple buffer size tables decreases as the buffer sizes increases.

27. A method for wireless communication at a user equipment (UE), comprising:

encoding, based on a buffer size table, a buffer status report for a buffer that stores data from an application, wherein the buffer size table is associated with a wireless communication technology and has a smaller step size for buffer sizes between two encoding points than a different buffer size table defined in the wireless communication technology, wherein the buffer sizes in the buffer size table correspond to a function of at least a first minimum buffer size and a number of encoding points, and wherein different buffer sizes in the different buffer size table correspond to the function of at least a second minimum buffer size and the number of encoding points; and transmitting, to a network node, the buffer status report indicating a logical channel identifier that corresponds to the buffer size table.

28. The method of claim 27, further comprising receiving, from the network node, a configuration for a logical channel group (LCG) corresponding to the application, wherein the buffer size table is based on the LCG corresponding to the application.

29. A method for wireless communication at a network node, comprising:

receiving, for a user equipment (UE), a buffer status report indicating a logical channel identifier that corresponds to a buffer size table;

decoding, based on the buffer size table, the buffer status report for a buffer that stores data from an application at the UE, wherein the buffer size table is associated with a wireless communication technology and has a smaller step size for buffer sizes between two encoding points than a different buffer size table defined in the wireless communication technology, wherein the buffer sizes in the buffer size table correspond to a function of at least a first minimum buffer size and a number of encoding points, and wherein different buffer sizes in the different buffer size table correspond to the function of at least a second minimum buffer size and the number of encoding points; and transmitting, for the UE and based on the buffer status report, an uplink grant for transmitting the data.

30. The method of claim 29, further comprising transmitting, for the UE, a configuration of a logical channel group (LCG) corresponding to the application.

* * * * *